US012182103B2

(12) United States Patent
Cohen et al.

(10) Patent No.: US 12,182,103 B2
(45) Date of Patent: *Dec. 31, 2024

(54) METHODS FOR EXTENDING A PROOF-OF-SPACE-TIME BLOCKCHAIN

(71) Applicant: Chia Network, Inc., San Francisco, CA (US)

(72) Inventors: Bram Cohen, San Francisco, CA (US); Krzystof Pietrzak, Vienna (AT); Mariano Sorgente, Tokyo (JP)

(73) Assignee: Chia Network, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,263

(22) Filed: Oct. 25, 2022

(65) Prior Publication Data

US 2023/0044605 A1    Feb. 9, 2023

Related U.S. Application Data

(63) Continuation of application No. 17/320,114, filed on May 13, 2021, now Pat. No. 11,507,569, which is a (Continued)

(51) Int. Cl.
*G06F 16/23* (2019.01)
*G06F 12/02* (2006.01)
(Continued)

(52) U.S. Cl.
CPC ...... *G06F 16/2379* (2019.01); *G06F 12/0223* (2013.01); *H04L 9/3239* (2013.01); *G06F 2212/1048* (2013.01); *H04L 9/50* (2022.05)

(58) Field of Classification Search
CPC ..... G06F 16/2379; H04L 9/3239; H04L 9/50; H04L 9/3247
(Continued)

(56) References Cited

U.S. PATENT DOCUMENTS 10,050,787 B1 *   8/2018   Johansson ............. H04L 9/0866
10,554,407 B1 *   2/2020   Greco ................... G06F 16/178
(Continued)

FOREIGN PATENT DOCUMENTS

CN       111371768 A   *   7/2020   ............. H04L 63/12
CN       114449000 A   *   5/2022

OTHER PUBLICATIONS

Abusalah et al., "Beyond Hellman's Time-Memory Trade-Offs with Applications to Proofs of Space", Cryptology ePrint Archive, 2017, pp. 1-23, <https://eprint.iacr.org/2017/893.pdf>. (Year: 2017).*
(Continued)

*Primary Examiner* — Phuong Thao Cao
(74) *Attorney, Agent, or Firm* — Run8 Patent Group, LLC; Peter Miller; Brian T. Chew

(57)   ABSTRACT

A method for extending a blockchain comprises, at a space server: allocating an amount of drive storage for generating proofs-of-space; or accessing a first challenge based on a prior block of the blockchain, the prior block comprising a first proof-of-space and a first proof-of-time; in response to accessing the first challenge, generating a second proof-of-space based on the first challenge and the amount of drive storage, the second proof-of-space indicating allocation of the amount of drive storage; accessing a second proof-of-time based on the prior block and indicating a first time delay elapsed after extension of the blockchain with the prior block; generating a new block comprising the second proof-of-space and the second proof-of-time; and broadcasting the new block over a distributed network.

12 Claims, 4 Drawing Sheets

Related U.S. Application Data continuation-in-part of application No. 15/931,463, filed on May 13, 2020, now Pat. No. 11,165,582.

(60) Provisional application No. 63/177,286, filed on Apr. 20, 2021, provisional application No. 62/850,221, filed on May 20, 2019.

(51) Int. Cl.
  *H04L 9/00* (2022.01)
  *H04L 9/32* (2006.01)
(58) Field of Classification Search
  USPC .......................................................... 707/703
  See application file for complete search history.

(56) References Cited

U.S. PATENT DOCUMENTS

| | | | |
|---|---|---|---|
| 10,572,855 B1* | 2/2020 | Levy | G06K 19/0723 |
| 11,037,227 B1* | 6/2021 | Padilha | G06F 21/602 |
| 11,245,528 B1* | 2/2022 | Greco | H04L 9/3213 |
| 11,418,402 B1* | 8/2022 | Jakobsson | H04L 41/044 |
| 11,570,001 B1* | 1/2023 | Greco | H04L 9/3239 |
| 2019/0386817 A1* | 12/2019 | Carson | H04L 9/0643 |
| 2020/0167512 A1* | 5/2020 | Chitra | G06Q 50/06 |
| 2020/0195421 A1* | 6/2020 | Gagnon | H04L 9/0637 |
| 2020/0389312 A1* | 12/2020 | Boneh | H04L 9/3247 |
| 2021/0019435 A1* | 1/2021 | Sanso | G06F 21/6218 |
| 2021/0226774 A1* | 7/2021 | Padmanabhan | H04L 9/0643 |

OTHER PUBLICATIONS

Ateniese et al., "Proof of Storage-Time: Efficiently Checking Continuous Data Availability", Cryptology ePrint Archive, 2020, pp. 1-23, <https://eprint.iacr.org/2020/840.pdf>. (Year: 2020).*
Boneh et al., "A Survey of Two Verifiable Delay Functions", Cryptology ePrint Archive, 2018, pp. 1-13, <https://eprint.iacr.org/2018/712.pdf>. (Year: 2018).*
Boneh et al., "Verifiable Delay Functions", Cryptology ePrint Archive, 2018, pp. 1-32, <https://eprint.iacr.org/2018/601.pdf>. (Year: 2018).*
Cohen, B., "Proofs of Space and Time", Blockchain Protocol Analysis and Security Engineering, 2017, 14 pages, <https://cyber.standford.edu/sites/default/files/bramcohen.pdf>. (Year: 2017).*
Dziembowski et al., "Proofs of Space", Cryptology ePrint Archive, 2013, pp. 1-31, <https://eprint.iacr.org/2013/796.pdf>. (Year: 2013).*
Moran et al., "Simple Proofs of Space-Time and Rational Proofs of Storage", Cryptology ePrint Archive, 2016, pp. 1-23, <https://eprint.iacr.org/2016/035.pdf>. (Year: 2016).*
Park et al., "SpaceMint: A Cryptocurrency Based on Proofs of Space", Cryptology ePrint Archive, 2015, pp. 1-29, <https://eprint.iacr.org/2015/528.pdf>. (Year: 2015).*
Pietrzak, K., "Simple Verifiable Delay Functions", Cryptology ePrint Archive, 2018, 20 pages, <https://eprint.iacr.org/2018/627.pdf>. (Year: 2018).*
Raikwar et al., "SoK of Used Cryptography in Blockchain", in IEEE Access, vol. 7, 2019, pp. 148550-148575. (Year: 2019).*
Park et al., "SpaceMint: A Cryptocurrency Based on Proofs of Space", Cryptology ePrint Archive, 2015, pp. 1-29, <https://eprint.iacr.org/2015/528.pdf> (Previously provided) (Year: 2015).*

* cited by examiner

METHODS FOR EXTENDING A PROOF-OF-SPACE-TIME BLOCKCHAIN

CROSS-REFERENCE TO RELATED APPLICATIONS

This Application is a continuation of U.S. patent application Ser. No. 17/320,114, filed on 13 May 2021 and now U.S. Pat. No. 11,507,569, which is a continuation-in-part application of U.S. patent application Ser. No. 15/931,463, filed on 13 May 2020 and now U.S. Pat. No. 11,165,582, which claims the benefit of U.S. Provisional Application 62/850,221, filed on 20 May 2019, each of which is incorporated in its entirety by this reference.

This Application is a continuation of U.S. patent application Ser. No. 17/320,114, filed on 13 May 2021, which claims the benefit of U.S. Provisional Application No. 63/177,286, filed on 20 Apr. 2021, each of which is incorporated in its entirety by this reference.

TECHNICAL FIELD

This invention relates generally to the field of cryptography and more specifically to a new and useful method for extending a proof-of-space-time blockchain in the field of cryptography.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Proof-of-Space Method

Figure 1:
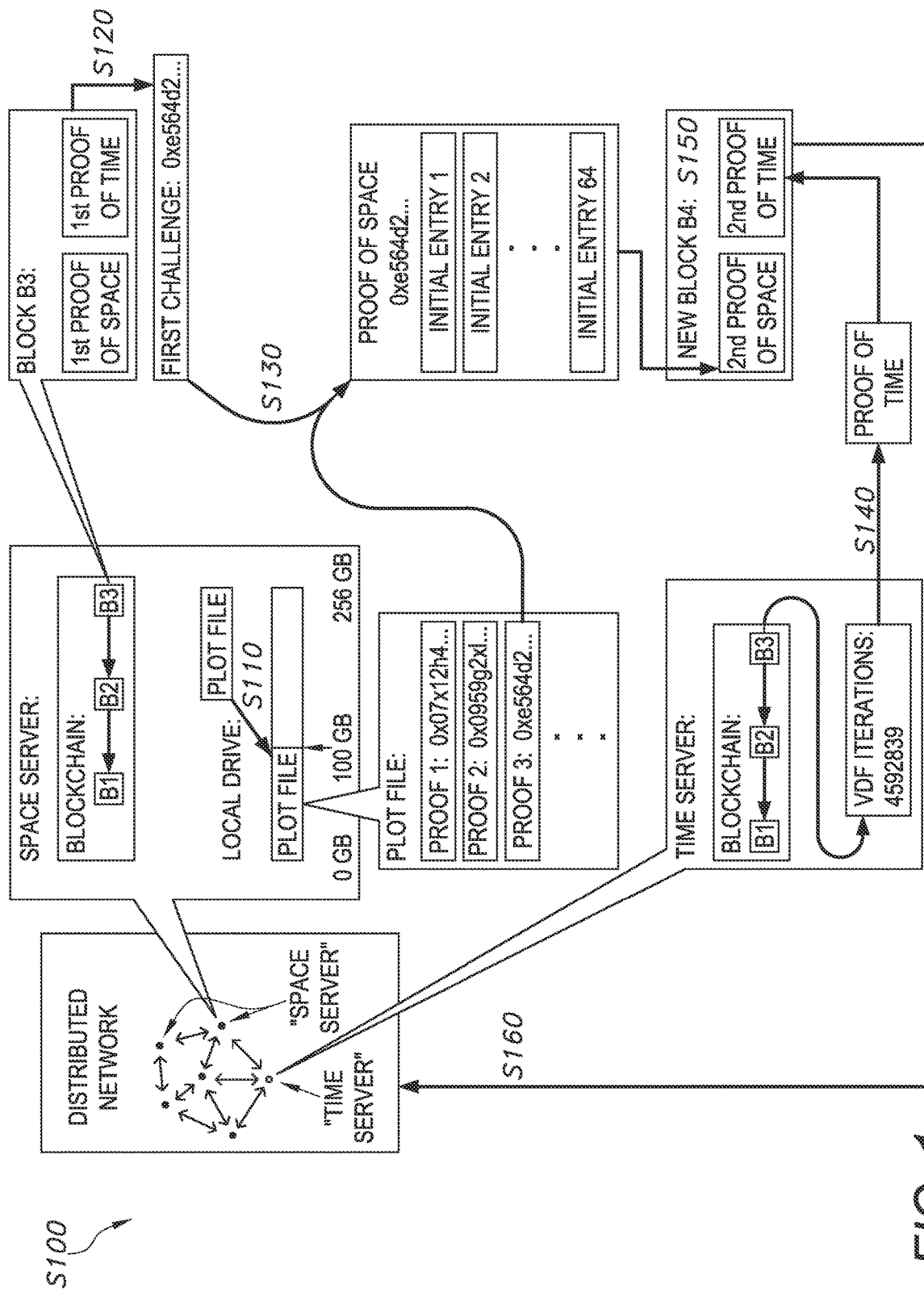
FIG. 1 is a flowchart representation of a first method.

As shown in FIG. 1, a method S100 for extending a blockchain includes, at a space server: allocating an amount of drive storage for generating proofs-of-space in Step S110; or accessing a first challenge based on a prior block of the blockchain, the prior block including a first proof-of-space and a first proof-of-time in Step S120; in response to accessing the first challenge, generating a second proof-of-space based on the first challenge and the amount of drive storage, the second proof-of-space indicating allocation of the amount of drive storage in Step S130; accessing a second proof-of-time based on the prior block and indicating a first time delay elapsed after extension of the blockchain with the prior block in Step S140; generating a new block including the second proof-of-space and the second proof-of-time in Block S150; broadcasting the new block over a distributed network in Block S160.

2. Proof-of-Time Method

Figure 2:
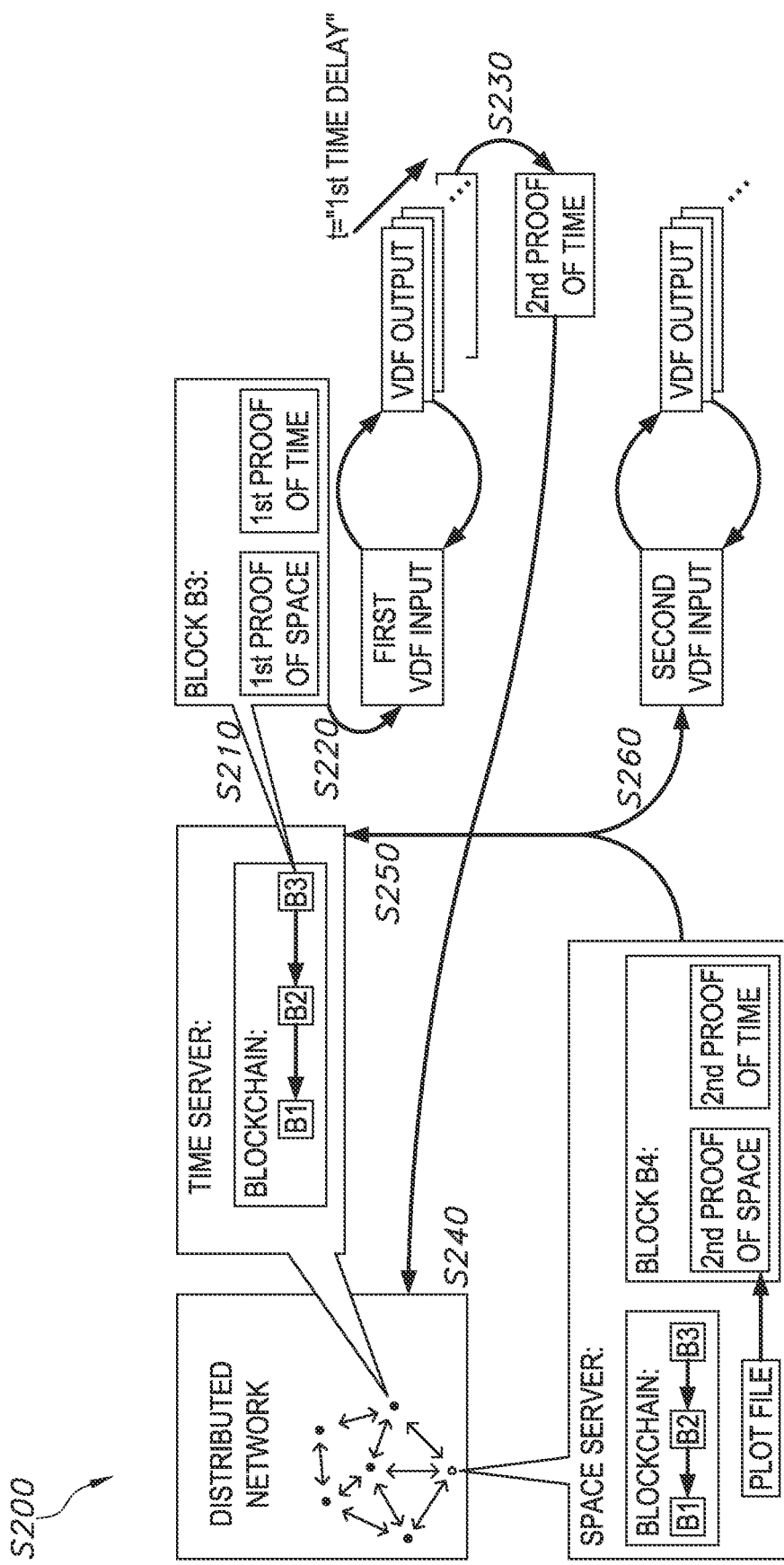
FIG. 2 is a flowchart representation of a second method.

As shown in FIG. 2, a method S200 for extending a blockchain includes, at a time server: accessing a prior block of the blockchain including a first proof-of-space and a first proof-of-time in Step S210; initiating a first thread of a verifiable delay function based on the prior block in Step S220. The method S200 further includes, in response to executing a first number of iterations of the first thread: generating a verifiable-delay-function output in Step S230; and broadcasting a second proof-of-time based on the verifiable-delay-function output over a distributed network, the first number of iterations indicating a first time delay elapsed after extension of the blockchain with the prior block in Step S240. The method S200 also includes: accessing a new block including a second proof-of-space and the second proof-of-time in Step S250; and initiating a second thread of the verifiable delay function based on the new block in Step S260.

3. Applications

Generally, the method S100 and the method S200 are executed by nodes (e.g., computational devices) in a distributed network (e.g., connected over the internet, a wide-area network, a local-area network) in order to extend a cryptographically-verifiable and Sybil-resistant blockchain including a proof-of-space and a proof-of-time within each block appended to the blockchain. More specifically, by executing the methods S100 and S200, nodes in the distributed network can extend a blockchain that includes: a canonical chain, which includes the proof-of-space, the proof-of-time, and signatures, and a data chain, which can include transactions or any other data to be represented in the blockchain and that are cryptographically linked (e.g., via signatures) to blocks of the reward chain. Thus, the distributed network can generate a blockchain that exhibits the desirable security and decentralization characteristics of proof-of-work-based blockchains while utilizing far less energy by leveraging proofs-of-space and proofs-of-time.

The method S100 and the method S200 are two parts of a consensus algorithm that, when executed by nodes in the distributed network, operate in tandem to add blocks to the blockchain, thereby enabling decentralized verification of information (e.g., transactions) in association with these blocks. A node in the distributed network executing the method S100 (hereinafter "a space server") is competing to generate a proof-of-space for a new block in the blockchain, while a node in the distributed network executing the method S200 (hereinafter a "time server") generates a proof-of-time for the new block in the block chain. Thus, by executing the method S100 and S200 concurrently, a space server and a time server can: generate a proof-of-space and a proof-of-time respectively; combine these proofs into a valid block via cryptographic signatures and hashes; and broadcast this block to the distributed network for inclusion in each node's local copy of the blockchain. Additionally, nodes that contribute to the creation of a new and valid block can include a reward for themselves in a data block associated with the new block, thereby incentivizing further participation in the consensus algorithm.

Generally, space servers generate a proof-of-space that is responsive to a challenge posed according to a most recent block (i.e., canonical block) of the blockchain. A "challenge", as referred to herein, describes a number that is some function (e.g., a hash) of a prior block within the blockchain. More specifically, space servers can: store a plot file on disk; receive a challenge based on the most recent block in the block chain; retrieve a proof-of-space (i.e., a series of tuples from the plot file) that confirms the presence of the plot file on disk and is responsive to the challenge; and calculate a quality of the proof-of-space. Therefore, the space servers compete against all the space servers in the distributed network to retrieve a high-quality proof-of-space (i.e., higher than a threshold quality) in order to win the ability to add a block to the blockchain. The space servers execute a proof-of-space algorithm that exhibits a property such that the probability of achieving a high-quality proof-of-space is directly proportional to the amount of space reserved for the plot file on disk, thereby conferring advantages to space servers with larger plot files stored on disk and/or a greater quantity of plot files stored on disk. Thus, via execution of Steps of the method S100, space servers compete in a space-based lottery to add blocks to the blockchain based on each space server's share of the total disk space reserved across the distributed network.

Generally, time servers generate a proof-of-time that is responsive to a challenge posed according to the most recent block in the blockchain by executing a verifiable delay function (hereinafter "VDF") based on the challenge, such that the number of iterations of the VDF that the time server executes is proportional to the "quality" of each proof-of-space generated by a space server in the distributed network. More specifically, time servers can: execute a VDF thread for a number of iterations proportional to the quality of a proof-of-space; and broadcast the VDF output to the space server that generated the proof-of-space, after completing the appropriate number of iterations, thereby enabling the space server to complete a new block. Thus, time servers in the network execute a quality-based number of VDF cycles as quickly as possible in order to pair the VDF output to the proof-of-space generated by a space server in the distributed network.

The consensus algorithm, as described herein, includes references to a single space server and a single time server. However, due to the nature of a distributed blockchain network, Steps of the method S100 and Steps of the method S200 can be executed concurrently by multiple space servers and by multiple time servers in competition to generate new blocks of the blockchain. Additionally, the distributed network can operate as a peer-to-peer network and, therefore, data—such as versions of the blockchain, challenge blocks, reward blocks, data blocks, challenges, signatures, and/or hashes—can be transferred between nodes in the distributed network directly or via a gossip protocol.

4. Terms

Generally, the distributed network referred to herein describes a computing environment spanning multiple nodes each of which maintain a copy of a decentralized ledger or database (e.g., a blockchain) and attempt to reach a trustless consensus regarding the state of the decentralized database. More specifically, the distributed network includes a set of nodes including space servers (or "space farmers"), which generate proofs of space to participate in forming a consensus around new blocks of the blockchain, and time servers (or "timelords"), which generate proofs of time to aid the space servers in generating new blocks for the blockchain, as described below.

Generally, the blockchain, as referred to herein, describes a data structure (which may be represented as a directed acyclic graph), which has been verified according to the consensus methods S100 and S200, a local copy of which is stored by each node in the network. The blockchain can refer to a verified or unverified data structure. Additionally, multiple groups of nodes may temporarily extend different versions of the blockchain due to regional or local consensus due to connectivity or latency between nodes of the distributed network.

In addition to nodes seeking to advance the blockchain, the distributed network can include client devices executing applications based on a current state of the blockchain. These client devices do not seek to participate in consensus and/or generate new blocks for the blockchain but can interpret data recorded by the blockchain in order to execute transactions, contracts, trades, view the status of the blockchain, and/or execute any other action based on the current state of the blockchain (as defined by the consensus of the distributed network).

Generally, each space server in the distributed network maintains an associated set of space parameters also referred to herein as a public-private key pair associated with a space server. Each space server can therefore generate unique proofs of space in order to contribute to the consensus method S100 described herein.

Generally, each time server in the distributed network maintains an associated set of time parameters also referred to herein as a difficulty factor for a VDF executed by the time server. This time parameter or difficulty factor can be algorithmically determined by each time server in order to achieve a target time delay between blocks added to the blockchain.

5. Blockchain Data Structure

Figure 3:
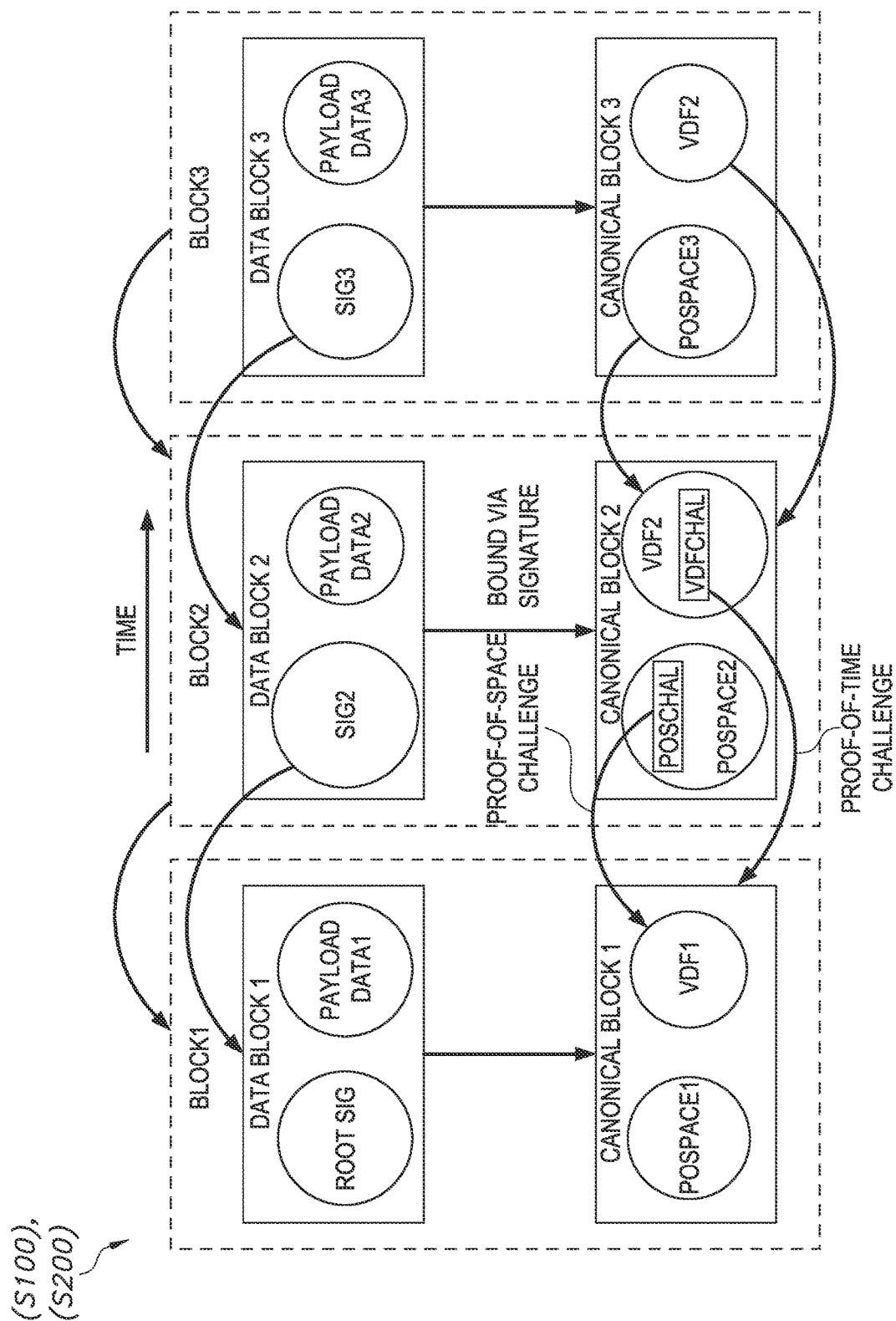
FIG. 3 is a schematic representation of a blockchain data structure.

As shown in FIG. 3, nodes in the distributed network execute the method S100 and the method S200 in order to create blockchain data structure (hereinafter "the blockchain") including a canonical chain and a data chain. More specifically, space servers and time servers cooperate to generate a blockchain including a set of blocks, each block including both a proof-of-space and a proof-of-time responsive to a prior block in the blockchain. Thus, by specifying that each canonical block in the blockchain includes both a proof-of-space and a proof-of-time, the distributed network limits the interval of time during which a space server can generate a proof-of-space, thereby preventing a time-space tradeoff (where a space server attempts to generate a proof-of-space without storing the plot file on drive) that would cause the blockchain to effectively tend toward a proof-of-work system. Additionally, by separating the canonical chain from the data chain, the distributed network increases the resistance of the network to grinding attacks.

The data chain is cryptographically linked to the canonical chain such that each data block includes a signature based on a canonical block in the canonical chain. Therefore, although the data chain is grindable, honest nodes in the distributed network can: evaluate the signatures within the data chain; and detect erroneous signatures by comparing the signatures with the contents of corresponding blocks in the reward chain.

5.1 Canonical Chain

Generally, the canonical chain includes a series of canonical blocks such that each canonical block is a response to a previous canonical block present within the canonical chain. Each canonical block within the canonical chain includes a proof-of-space responsive to a challenge based on the previous canonical block (e.g., a hash of a proof-of-time on the previous canonical block), a proof-of-time (i.e., a VDF output) indicating proof of a time delay since completion of the prior block, and a proof-of-space signature based on the proof-of-space. Thus, each canonical block represents an un-grindable and secure blockchain with a predefined structure that does not change between blocks (e.g., via inclusion of a variable data payload)

In yet another implementation, each canonical block includes a proof-of-time cryptographically signed based on a key within the proof-of-space. More specifically, a space server that generated the proof of work can store a plot key within the plot file, thereby enabling the space server to create a unique signature for each block for which the space server has generated a proof-of-space.

5.2 Data Chain

Generally, the data chain includes a series of data blocks, which can represent transaction data and are associated with the canonical chain via cryptographic signatures and hashes corresponding to particular canonical blocks. More specifically, upon creating a canonical block, a space server can generate a corresponding data block based on a hash of the most recent data block in the data chain and sign this data block with a signature based on the proof-of-space of the canonical block. Thus, although the data chain can be modified (e.g., grinded) by malicious nodes in the distributed network, honest nodes can detect these modifications by checking the signatures included within each data block in order to identify whether the data blocks correspond directly to the canonical blocks in the grinding-resistant canonical chain. Since honest space servers can only sign a single data block per canonical block generated, the data chain remains secure from malicious reorganization.

In one implementation, a space server that generates a canonical block in the canonical chain can include transactions (e.g., cryptocurrency transactions) from a pending transaction buffer in a corresponding data block of the canonical block. Thus, each space server in the network can maintain a running buffer of transactions communicated over the distributed network and insert these transactions into a data block upon successfully generating a canonical block in the canonical chain. Additionally, the space server can collect a reward for successfully appending a new canonical block to the blockchain and record this reward within the data block, thereby providing an incentive for users operating space servers to continue executing the method S100 to append new canonical blocks to the canonical chain.

6. Distributed Network

Generally, a distributed network of communicating nodes, including space servers and time servers, extends the blockchain structure described above by executing the methods S100 and S200 respectively. More specifically, each node within the distributed network can operate one or more space server instances and/or one or more time server instances, therefore a single node can participate in the blockchain by executing the methods S100 and/or S200.

Generally, nodes in the distributed network can communicate via gossip protocol (or another decentralized communication protocol) to transfer proofs-of-space, proofs-of-time (e.g., VDF outputs), challenges for new proofs-of-space and proofs-of-time, as well as finished and unfinished blocks of the blockchain. Thus, each node of the distributed network maintains and attempts to extend at least one local copy of the blockchain (or a compressed or concatenated version thereof) in order to execute Steps of the methods S100 and S200. The process by which each node selects a version of the blockchain to extend is further described below.

7. Chain Selection

Generally, prior to executing the method S100 and/or the method S200, nodes in the distributed network can access (e.g., receive via the decentralized communication protocol of the distributed network) multiple versions of the blockchain and evaluate one or more versions to extend according to the methods S100 and/or S200. More specifically, nodes in the distributed network can: verify that each version of the blockchain is legitimate (e.g., includes canonical blocks with valid proofs-of-time and proofs-of-space and/or includes data blocks with valid transactions and valid signatures associating these data blocks with corresponding canonical blocks); calculate a depth of each version of the blockchain; and extend the valid version of the blockchain characterized by the greatest depth (e.g., total number of blocks). In particular, a node in the distributed network can access a challenge based on a prior block of a blockchain in response to verifying the prior block as a valid block of the blockchain. Thus, nodes in the distributed network consistently attempt to extend those versions of the blockchain to which the largest number of honest nodes have contributed.

In one implementation, nodes in the distributed network can calculate a "weight" of each version of the blockchain and extend those versions of the blockchain with the greatest weight. The nodes of the distributed network calculate the weight of the blockchain as a function of both the number of blocks in the version of the blockchain and the quality of the proofs-of-space and/or the proofs-of-time included in the version of the blockchain. Thus, when multiple versions of the blockchain exist that are characterized by the same or similar depths, nodes in the distributed network are still able to select one or more versions of the blockchain to extend via the methods S100 and S200.

In another implementation, nodes in the distributed network can simultaneously extend multiple versions of the blockchain of the same depth (or weight) in parallel in order to prevent double dipping attacks, which are attacks in which a malicious node attempts to extend blocks not specified by the protocol, which may be more favorable to the malicious node. Thus, by extending multiple versions of the blockchain in parallel, the honest nodes in the distributed network can extend even those versions of the blockchain that are not the deepest or weightiest versions, thereby decreasing the probability that a malicious node can extend shorter chains (e.g., the second, third, or fourth longest chain) faster than the honest nodes of the distributed network.

8. Space Server

Generally, a space server in the distributed network executes the method S100 to compute proofs of space in order to create canonical and data blocks with which to extend the blockchain. More specifically, a space server in the distributed network can: generate a unique public-private key pair with which to generate plot files and/or sign newly generated blocks; allocate space an amount of drive storage (i.e., by generating plot files occupying space on disk); generate proofs-of-space in response to challenges received via the distributed network; and upon generating a valid proof-of-space to a challenge, generating a canonical block and a data block with which to extend the blockchain. Thus, each space server on the distributed network can cryptographically prove that the space server has allocated unused disk space in order to "win" the privilege to add blocks to the blockchain.

8.1 Initialization

Generally, the space server can initiate its instance by: establishing a connection to the distributed network; downloading a current state of the blockchain; and generating a public-private key pair associated with the space server. Thus, the space server can maintain a copy of the blockchain and generate a unique public-private key pair with which to generate plot files specific to the space server and with which to sign new blocks generated by the space server.

In one implementation, the space server can generate a public-private key pair and secretly store the private key of the public-private key pair in order to secure plot files generated by the space server.

8.2 Plotting

Figure 4:
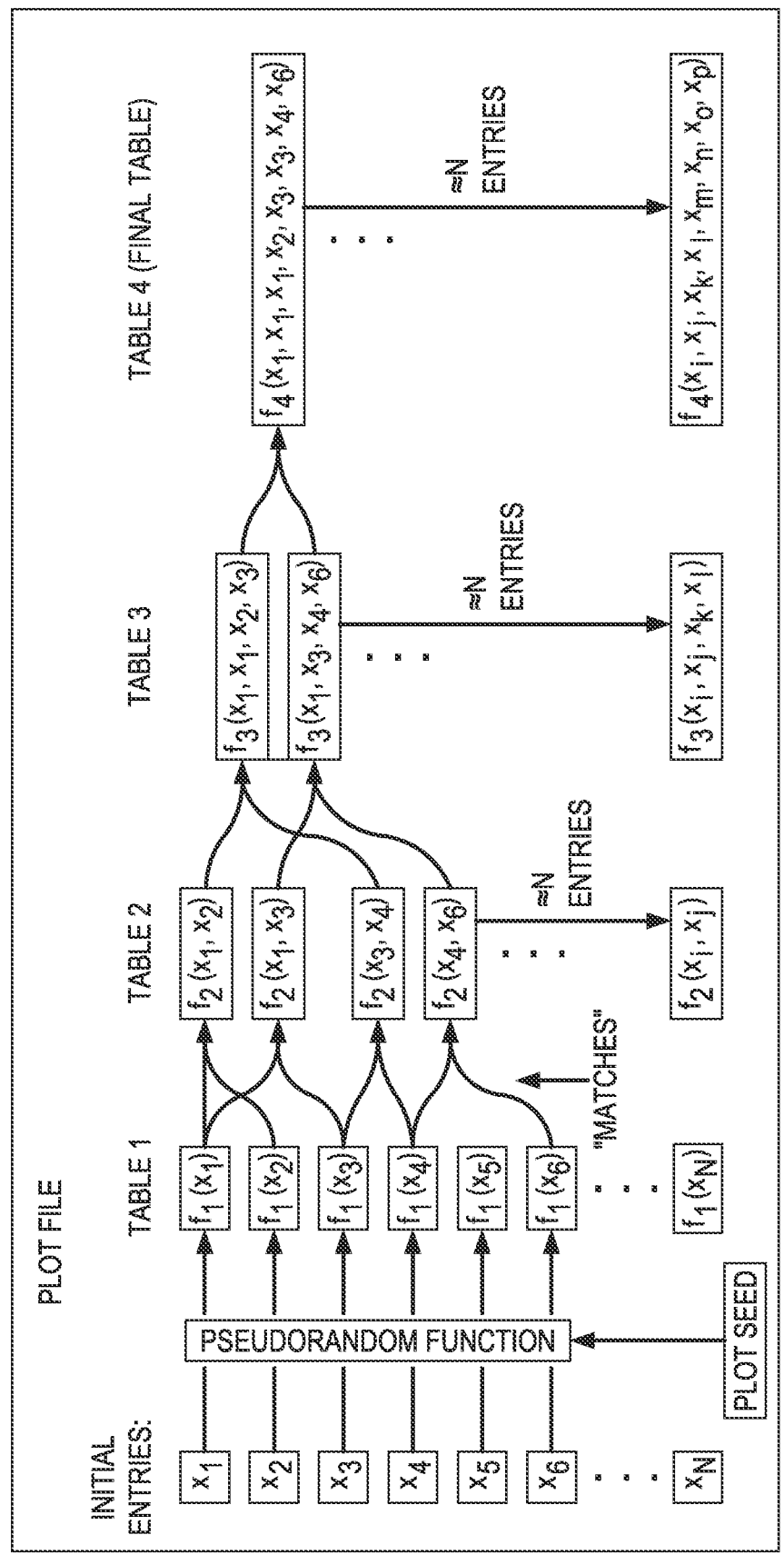
FIG. 4 is a schematic representation of a plot file.

Generally, the space server can allocate an amount of drive storage for generating proofs-of-space in Step S110. More specifically, as shown in FIG. 4, the space server can: generate a plot file characterized by the amount of drive storage and associated with the space server (i.e., via inclusion of a cryptographic key within the plot file); and store the plot file on a drive accessible by the space server. Thus, the space server can algorithmically generate a set of unique plot files that occupy the allocated drive space accessible by the space server. Each plot file defines a structure that cryptographically verifies its presence on a drive accessible to the space server and prevents malicious nodes from generating proofs-of-space in response to challenges without allocating drive storage (e.g., via a time-space tradeoff attack). Therefore, through these characteristics of the plot file, the space server ensures that the blockchain remains a proof-of-space-based blockchain.

In one implementation, the space server can generate the plot file by generating a set of tables (e.g., seven tables) representing proofs-of-space based on a plot seed, the set of tables representing proofs-of-space characterized by a resistance to time-space tradeoff attacks. In this implementation, the set of tables includes many individual proofs-of-space (e.g., 4,294,967,296 proofs-of-space for 100 GB of allocated drive space). Thus, the space server can identify a match between a challenge and one of the proofs-of-space represented in the plot file.

8.2.1 Forward Propagation

Generally, the space server can generate a plot file by: generating a series of initial entries (e.g., 32 bit entries from 0 to $2^{32}$) in a first table; generating, via a pseudorandom function (e.g., based on a plot seed), a series of output entries in the first table, such that each output entry corresponds to an initial entry in the series of initial entries; identifying matches between pairs of output entries, based on a matching condition; and, in response to identifying a matching pair of output entries, executing a cryptographic hash function (e.g., BLAKE3) based on a pair of initial entries corresponding to the pair of output entries in order to generate a forward-propagated entry in a subsequent table (e.g., table two). The space server can then, for each subsequent table in the set of tables: identify matching pairs of entries in the table (derived from entries in a prior table) to generate a forward-propagated entry in a subsequent table based on the initial entries in table one corresponding to the matching pair of entries. Thus, the space server can forward-propagate an initial set of randomly generated entries, based on a plot seed, through multiple tables, such that each entry in a table corresponds (via the cryptographic hash function and the matching condition) to two entries in the previous table, which can be traced back to a set of initial entries in the first table (over multiple executions of the cryptographic hash function).

The above-described forward-propagation algorithm, executed by the space server, is difficult to compute in the forward direction (e.g., requires on the order of hours to complete) and enables easy verification in the backward direction. More specifically, each entry in the final table in the set of tables represents a binary tree extending through the set of tables. For example, in a set of seven tables, an entry in the seventh table corresponds to two entries in the sixth table, those two entries in the sixth table correspond to four entries in the fifth table, those four entries in the fifth table correspond to eight entries in the fourth table, those eight entries in the fourth table correspond to sixteen entries in the third table, those sixteen entries in the third table correspond to 32 entries in the second table, and those 32 entries in the second table correspond to 64 initial entries in the first table. Thus, each entry in the final table represents a proof that the entire plot file is present on disk and constitutes a proof-of-space for the amount of drive space allocated by the space server.

In particular, the space server can generate a first table in the set of tables by, for each initial entry in a series of initial entries: executing a pseudorandom function of the initial entry and the plot seed to generate an output entry in a series of output entries, the output entry corresponding to the initial entry; and, for each pair of output entries in the series of output entries satisfying a matching condition, executing a cryptographic hash function based on a pair of initial entries corresponding to the pair of output entries to generate a table-two entry in a series of table-two entries. Then, for each subsequent table in the plot file (e.g., tables two through seven of a seven table plot file), the space server can, for each pair of forward-propagated entries satisfying the matching condition in a series of forward-propagated entries of the table, execute the cryptographic hash function based on a set of initial entries corresponding to the pair of forward propagated entries to generate a subsequent-table entry in a series of subsequent-table entries. Thus, for each subsequent table of the plot file, the space server identifies a pair of matching entries in the table, accesses a set of initial entries (from table one) corresponding to the pair of matching entries, and generates an entry for a subsequent table by executing the cryptographic hash function based on the set of initial entries.

In one implementation, the space server evaluates a matching condition on each pair of entries in a table by identifying that the pair of entries belong to adjacent buckets, the same bucket, or a related subset of buckets in a set of buckets defined over the range of possible entry values. For example, the system can define approximately 15,000 buckets in a space of approximately 4.3 billion possible entry values. In this implementation, the space server can define a bucket size over the space of possible entry values that corresponds to a statistically predicted number of matches sufficient to generate a subsequent table. For example, a larger number of buckets relative to the space of possible entry values decreases the likelihood of matching entries, while a smaller number of buckets relative to the space of possible entry values increases the likelihood of matching entries. Thus, the plotting algorithm executed by the space server can predefine a bucket size such that resulting plot files are characterized by approximately a predetermined size for a given range of possible entry values (e.g., within five MB).

In one example, the space server evaluates a matching condition such that each entry in the table is statistically expected to match with one other entry and therefore generate a child entry in a subsequent table for each parent entry in the current table. Thus, in this example, the size of each table in the plot file remains approximately consistent (within a few percent) regardless of the depth of the table in the plot file. This property limits the effectiveness of time-space tradeoff attacks because these attacks are only as successful as the largest table in the plot file.

In another example, the space server can define a graph of buckets such that each bucket in the graph of buckets is associated with a predetermined number of other buckets. In this example, the space server evaluates a matching condition specifying that any two entries belonging to associated buckets constitutes a pair of matching entries. Thus, in this implementation, the space server can define a number of buckets in excess of the number of entries in each table (e.g., by a factor of 32) and specify (via the graph of buckets) that each bucket is associated with 63 other buckets (i.e., a subset of buckets). Thus, in this example, the space server, on average, identifies a match for each entry since each subset of buckets is expected to include two entries resulting in a match.

In yet another example, the space server can define a graph of buckets such that each subset of associated buckets is concentrated locally within the range of possible entry values, such that matching entries are likely to be sorted within a small number of entries from each other. In this example, the space server can reduce the size of the plot file via pointer compression due to the relative proximity of matching entries within each table when sorted. Additionally, in this example, the topography of the graph of buckets can be generated such that the likelihood of compressible or patterned relationships between matching entries (e.g., loops such as entry one matching with entry two, entry two matching with entry three, and entry three matching with entry one) is low.

In another implementation, the space server can, prior to identifying pairs of matching entries within a table, sort the forward-propagated entries in the table in order to more efficiently identify matches between entries in the table. More specifically, given the size occupied by each table, the space server can execute a sort-on-disk such that the forward-propagated entries of a table are sorted into ascending order. Thus, by sorting the entries in ascending order, the space server can reduce the number of disk reads required to evaluate the matching condition. For example, upon sorting the entries of a table, the space server can utilize a sliding window to efficiently identify matching entries. Additionally, in this implementation, the space server can execute a linear time sorting algorithm (e.g., bucket sort) or quick sort in order to arrange the entries in ascending order.

In yet another implementation, the space server generates a unique plot seed with which to generate a unique plot file. In this implementation, the space server can generate the plot seed as a cryptographic hash of a private key associated with the space server and a pseudorandom value. Thus, each plot file is both unique and cryptographically associated with the space server, thereby preventing space servers from generating proofs-of-space from plot files generated by another space server.

In yet another implementation, the space server can execute a pseudorandom function in order to convert the initial entries of the plot file into output entries in table one of the plot file. In this implementation, the space server executes a pseudorandom function that is a cryptographic stream cypher (e.g., ChaCha8) of the plot seed and the initial entry on which the pseudorandom function is executed. Thus, given a predetermined set of initial entries (e.g., a set of consecutive entries spanning a predetermined range of entries) and a unique plot seed, the space server can deterministically generate the plot file.

In yet another implementation, the space server can execute a depth-dependent cryptographic hash function in order to generate a forward-propagated entry for a subsequent table from a pair of matching entries in the current table in order to account for depth dependent changes in the size of the set of initial entries that corresponds to the pair of matching entries. For example, in table two of the plot file, each matching pair of entries corresponds to two initial entries of the plot file. However, in table six of the plot file, each matching pair of entries corresponds to 32 initial entries of the plot file. Therefore, the space server can execute a cryptographic hash function that collates and/or concatenates the set of initial entries corresponding to the matching pair of entries in order to reduce the amount of temporary storage required to compute a forward-propagated entry via the cryptographic hash function.

Upon generating a final table in the plot file via the aforementioned forward-propagation steps, the space server can sort and/or index the final entries of the final table such that each final entry can be quickly matched to a challenge received via the distributed network. Thus, in order to generate a proof-of-space based on the plot file, the space server can identify a final-table entry in a series of final table entries, the final table entry: responsive to the challenge; and representing a binary tree of entries extending through the set of tables.

8.2.2 Backpropagation

As described above, with respect to the forward propagation process, executed by the space server while generating a plot file, not all entries in a given table of the plot file satisfy the matching condition. In one variation, the space server, upon completion of the forward-propagation process, backpropagates through the set of tables of the plot file to remove entries that do not contribute to a final entry in the final table of the plot file. Thus, the space server can reduce the drive space occupied by a single plot file be removing unnecessary data from the final plot file.

Although, in some implementations of this variation, the space server can remove unmatched entries while identifying matching entries within a particular table of the plot file, the space server may not be able to identify entries from prior tables that are orphaned by the deletion of these unmatched entries. Thus, during backpropagation, the space server can identify those entries that may have matched with another entry in the table in which they are stored but do not contribute to an entry in the final table of the plot file (i.e., entries that have children in a subsequent table but no grandchildren, great-grandchildren, etc. in succeeding tables).

In one implementation of this variation, the space server can track unmatched entries at each generation via a bitfield, thereby improving write efficiency when removing unmatched entries from each table of the plot file.

8.2.3 Compression

In one variation, the space server can, upon generating a forward-propagated entry for a subsequent table of the plot file, store the forward-propagated entry in association with a position (in the prior table) of a first entry in the pair of matching entries from which the forward-propagated entry was generated and an offset between the position of the first entry and a position of a second entry. Although, this position-offset format for storing the entries is space inefficient, the space server can utilize this format to quickly locate the set of corresponding initial entries on which an entry in a table of the plot file is based. Thus, the space server can compress the set of tables by replacing the position-offset format with a double-pointer format, such that each entry in a table points back to two entries in a prior table.

Additionally, the space server can further compress the pointers since each pointer to a position in the prior table contains redundant information to the other pointer in the double-pointer format (especially when the prior table has been sorted in ascending order). Thus, the space server can compress the set of tables to establish pointers representing propagation of entries in the set of tables, the pointers defining a binary tree extending through the set of tables.

8.3 Challenge Acquisition

Generally, upon allocating drive space accessible to the space server (e.g., via creation of plot files occupying this drive space), the space server can receive challenges based on a current version of the blockchain in Step S120. More specifically, the space server can access a challenge based on a prior block of the blockchain, the prior block including a first proof-of-space and a first proof-of-time. Thus, the space server can access or receive the challenge and attempt to look-up the challenge within a plot file within drive storage accessible to the space server.

In one implementation, the space server receives challenges periodically broadcast from a time server that are VDF outputs based on a prior block of the blockchain. In another implementation, the space server: receives a VDF output broadcast by a time server; calculates a cryptographic signature of the VDF output based on a private key associated with the space server, and calculates a cryptographic hash of the cryptographic signature to generate a challenge.

In yet another implementation, the space server receives a prior block of the blockchain (including both a proof-of-space and a proof-of-time) and calculates a challenge based on a cryptographic function of the block. Thus, the space server can receive or cryptographically calculate a challenge based on a prior block in the blockchain in order to generate a proof-of-space responsive to the challenge.

8.4 Proof-of-Space Generation

Generally, in response to accessing the challenge, the space server can generate a proof-of-space based on the challenge and the amount of drive storage, the proof-of-space indicating (or proving) allocation of the amount of drive storage in Step S130. More specifically, the space server can: generate the proof-of-space based on the challenge and the amount of drive storage, the proof-of-space indicating allocation of the amount of drive storage; execute a quality function based on the proof-of-space and the challenge to generate a quality characterizing the proof-of-space; and calculate a time delay based on the quality. Thus, when generating a proof-of-space responsive to a challenge, the space server can also calculate a quality of the proof-of-space in order to ascertain an amount of time (as measured by a proof-of-time generated by a time server) sufficient to add the block to the block chain. For example, if the space server calculates a relative quality of the proof-of-space, then the time delay to generate a block including the proof-of-space is relatively short. However, if the space server calculates a relatively low quality, the time delay to generate a block including the proof-of-space is relatively long. Therefore, the space server in the distributed network that generates the highest quality proof-of-space in response to a given challenge is able to generate a block to add to the blockchain first.

Upon receiving a challenge, the space server can execute a look-up to determine if any of the final entries in the final table of the plot file match the challenge. If no final entries match the challenge, then the space server cannot generate a proof-of-space responsive to the challenge. Instead the space server waits to receive a subsequent challenge from the distributed network. Alternatively, if a final entry does match the challenge, the space server can calculate a quality of the proof-of-space based on the binary tree of table entries corresponding to the final table entry that matches the challenge. Thus, this binary tree of values, the leaves of which represent the set of initial values corresponding to the final entry matching the challenge, constitutes a proof-of-space allocated by the space server.

In one implementation, the space server calculates the quality of a proof-of-space by executing a cryptographic hash of the challenge concatenated with a component of the proof-of-space. For example, the space server can calculate a quality of the proof-of-space by looking up one branch of the binary tree associated with the proof-of-space and hashing this branch with the challenge to generate a quality value for the proof-of-space. In this implementation, the space server can calculate a quality of the proof-of-space while only accessing a single branch of the proof-of-space and, in response to identifying that the quality of the proof-of-space exceeds a threshold quality, retrieve the remaining initial values constituting the proof-of-space.

8.5 Proof-of-Time Reception

Generally, upon generating a proof-of-space in response to the challenge, the space server can wait to access a proof-of-time indicating or proving that the quality-based time delay corresponding to the proof-of-space has elapsed since generation of the challenge for the proof-of-space in Step S140. More specifically, the space server can access a proof-of-time based on the prior block of the blockchain and indicate a time delay elapsed after extension of the blockchain with the prior block (or since issuance of the challenge to which the proof-of-space is responsive). Thus, by waiting for quality-dependent time delay to receive a proof-of-time, the space server ensures that the proof-of-space was generated during that time, thereby preventing time-space tradeoff attacks on the blockchain. Additionally, because the first space server to add a block to the blockchain in response to a given challenge can then write a data block (e.g., a transaction) to the blockchain, each space server is incentivized not to withhold blocks longer than the quality-dependent time delay, lest another space server submit a block before the space server.

In one implementation, the space server accesses a VDF output based on the prior block and characterized by a number of VDF iterations corresponding to the quality-dependent time delay or a time-delay greater than the quality-dependent time delay. In another implementation, the space server can receive the proof-of-time (or VDF output) from a time server in the distributed network. Alternatively, the space server can also execute a time server instance and, therefore, execute a VDF function based on the prior block for the quality-dependent time delay to locally generate the proof-of-time.

8.6 Block Creation

Generally, upon generating a proof-of-space and accessing a proof-of-space (e.g., either via a locally executing VDF or a VDF output received via the distributed network), the space server can generate a new block to add to the blockchain including the proof-of-space and the proof-of-time in Step S150. More specifically, the space server can generate a new canonical block including the proof-of-space and the proof-of-time and can also generate a data block associated with the new canonical block, the new data block including: a data payload; a cryptographic signature based on the second proof-of-space; and a cryptographic hash of a prior data block. Thus, in response to receiving or accessing a VDF output indicating passage of the quality-based time delay (e.g., indicating a quality-based number of VDF iterations corresponding to the time delay), the space server can generate a new block for both the canonical chain and the data chain, thereby extending the blockchain to securely store new data over the distributed network.

In one implementation, when generating a canonical block, the space server can access the proof-of-time to be included in the new canonical block and sign the proof-of-time via a private key associated with the proof-of-space, thereby verifiably binding the proof-of-space to the proof-of-time within the block. Thus, other nodes in the distributed network, upon receiving the newly generated canonical block, can quickly verify the legitimacy of the new block by verifying the signature of the proof-of-time with the private key associated with the proof-of-space.

In another implementation, the space server can include a full set of initial entries that correspond to the proof-of-space from the plot file from which the proof-of-space was generated. For example, for plot files that include a set of seven tables and an initial entry range from zero to $2^{32}$ (e.g., each entry is a 32-bit binary sequence), the proof-of-space includes 64 initial entries (e.g., the leaves of a binary tree extending through all seven tables) of 32 bits each, thereby resulting in a proof-of-space size of 256 bytes. Thus, the space server can generate new canonical blocks characterized by a small size enabling transfer of new blocks through the distributed network without occupying significant network bandwidth.

Generally, in order to generate a new data block associated with the new canonical block, the space server can maintain a data buffer based on communications from the distributed network aggregated since generation of the previous block. The space server can create a data payload for the new data block based on the data buffer, calculate a cryptographic hash of a prior data block in the data chain, and sign the data block based on the private key associated with the proof-of-space. Additionally, honest space servers sign only a single data block with each proof-of-space generated. Thus, the space server ensures that other nodes in the network can, based on the cryptographic signature included in the new data block, associate the new data block with the new canonical block. As a result, despite the fact that the data chain may be vulnerable to a grinding attack, nodes in the network will be able to reject data chains that do not have a one-to-one correspondence to canonical blocks in the canonical chain.

In one implementation, when the blockchain represents transactions of a cryptocurrency, the space server can include a predetermined (e.g., by the distributed network) reward within a new data block in addition to the buffer of transaction data collected since creation of a prior block. Therefore, a space server can issue itself a predetermined quantity of the cryptocurrency as a transaction within a new data block created by the space server, thereby incentivizing space servers to continually generate new blocks. Thus, the space server can generate a new data block associated with the new canonical block, the new data block including: a data payload comprising transaction data and reward data; a cryptographic signature based on the proof-of-space; and a cryptographic hash of a prior data block.

8.7 Block Broadcasting

Generally, the space server can broadcast the new block over a distributed network in Block S160. More specifically, upon completing the new canonical block and the associated new data block, the space server can broadcast these blocks to other nodes in the network for verification by these nodes and inclusion within each node's local copy of the blockchain. Thus, as space servers in the distributed network complete blocks and transmit these blocks to the distributed network the distributed network can collectively extend the blockchain and maintain a secure and decentralized digital record based on proofs-of-space and proofs-of-time.

9. Time Server

Generally, a time server in the distributed network executes the method S200 to compute proofs-of-time to contribute to canonical blocks created by space servers in the distributed network. More specifically, a time server in the distributed network can continuously iterate a VDF thread based on a prior block in the blockchain in order to provide a proof-of-time for new blocks generated in response to the prior block by space servers in the distributed network. Thus, each time server on the distributed network can cryptographically prove that a specific amount of time (represented by the number of VDF iterations completed by the time server) has passed since completion of a prior block in the blockchain, thereby limiting the amount of time with which the space servers can generate proofs-of-space.

Although the distributed network can include multiple time servers, each executing VDF threads, often based on the same prior block or set of prior blocks across multiple versions of the blockchain, the time server that generates the VDF the fastest can transmit resulting proofs of time over the distributed network. This is because each VDF thread is deterministic based on a specific challenge and may not be dependent on the particular time server executing the VDF. Thus, the time servers that are slower than the fastest time servers may provide redundant proofs of time to the distributed network. However, by including multiple time servers in the distributed network, the distributed network maintains redundancy in cases in which the fastest time server goes offline or there are local splits in the distributed network, thereby increasing the resiliency of the network to local connectivity issues.

Generally, each time server in the distributed network can execute multiple VDF threads in parallel, each VDF thread based on a different version of the blockchain. For example, the time server can execute a VDF thread for the three longest blockchains available over the distributed network. By following multiple versions of the blockchain, the time server can out-complete malicious time servers attempting to extend an illegitimate version of the blockchain, thereby limiting the impact of malicious time servers.

In one implementation, the time server can continuously execute a VDF thread, thereby generating a potential proof-of-time (e.g., a VDF output) for each iteration of the VDF thread. In this implementation, the time server can periodically (once every million VDF iterations) broadcast a VDF output from the VDF thread over the distributed network. Thus, the time server can function as a timekeeper for the network and periodically release proofs-of-time for space servers in the distributed network in order to incorporate new blocks (assuming the proof-of-time indicates at least the quality-dependent time delay of a proof-of-space generated by a space server).

Alternatively, the time server can continuously execute a VDF thread and generate a proof-of-time (i.e., a VDF output) in response to receiving a request for a proof-of-time from a space server. In this implementation, the space server can generate a proof-of-space in response to a prior block and can transmit the proof-of-space to the time server over the distributed network. The time server can then verify the proof-of-space and reply with a proof-of-time for inclusion in the new block to be generated by the space server.

9.1 Challenge Acquisition

Generally, the time server can acquire a challenge with which to initiate a VDF thread by: accessing a prior block of the blockchain including a proof-of-space and a proof-of-time in Step S210. More specifically, the time server can: receiving the prior block from a space server in the distributed network; and initiate a VDF thread based on the prior block (e.g., based on a hash of the prior block). Thus, as the time server receives completed blocks from space servers via the distributed network, the time server can initiate one or more VDF threads in order to generate proofs of time for new blocks descendent from each completed block.

9.2 Thread Initiation

Upon receiving a prior block of the blockchain, the time server can initiate a VDF thread based on the prior block in Step S220. More specifically, the time server can: initiate a first thread of a VDF based on a first cryptographic hash of the prior block; and, in response to receiving a new block based on the prior block, initiate a second thread of the VDF based on a second cryptographic hash of the new block. Thus, for each new verified block received by the time server, the time server can abandon a first VDF thread (based on an older block in the same version of the blockchain) in favor of executing a second VDF thread based on the latest block of the blockchain.

9.3 Proof-of-Time Generation

Generally, the time server executes a VDF in order to generate proofs-of-time in Step S230 and broadcasts these proofs-of-time over the distributed network in Step S240. More specifically, in response to executing a number of iterations of a VDF thread, the time server can: generate a VDF output; and broadcast a proof-of-time based on the VDF output over a distributed network, the number of iterations indicating the quality-dependent time delay elapsed after extension of the blockchain with the prior block. Thus, the time server generates proofs-of-time for inclusion in new blocks by time servers and, specifically, provides proof that the quality-dependent time delay for the new block has elapsed such that the space server can append the new block to the blockchain.

Generally, the time server can execute a VDF that is non-parallelizable and therefore can function as an accurate proof of the passage of wall clock time (as opposed to a proof of parallelized compute time). Additionally, the time server can execute a VDF that can be easily verified by nodes in the distributed network, for example, within constant, or logarithmic time relative to the number of iterations of the VDF. These properties prevent unbounded increases in the speed of VDF iteration (via increasingly optimized parallelization) while enabling fast verification of these VDF outputs by these space servers. Additionally, the time server executes a VDF that generates unique proofs-of-time for each input and for each iteration of the VDF. Furthermore, the time server executes a VDF characterized by sequentiality, which indicates that, for a particular VDF output corresponding to a first number of iterations, there exists no second number of iterations less than the first number of iterations to generate the same VDF output.

In one implementation, the time server executes a VDF by: generating a class group of unknown order based on a cryptographic hash of the prior block; and, for each of a number of iterations, squaring a binary quadratic form over the class group of unknown order. Thus, in order to initiate a new VDF thread, the time server can convert a cryptographic hash of a prior block of the blockchain or a challenge based on the cryptographic hash of the prior block of the blockchain to a quadratic form representation over a class group of unknown order. The time server can, upon converting the challenge into a quadratic form over a class group of unknown order and, for each iteration of the VDF, square the quadratic form to generate a subsequent quadratic form for squaring in a subsequent iteration. Thus, a time server executing a VDF based on quadratic forms over class groups of unknown orders satisfies the desired characteristics described above.

In another implementation, the time server can calculate the number of iterations based on a difficulty factor and a time delay. For example, the distributed network can collectively target a specific time delay (e.g., a minimum time delay) between consecutive blocks of the blockchain and adjust a difficulty factor that specifies a multiplier for the number of VDF iterations per block based on the current performance of the fastest time server in the distributed network. For example, if the distributed network targets a new block every 20 seconds, the time server can calculate a difficulty factor such that the number of VDF iterations for each proof-of-time broadcasted to the network corresponds to the target time delay of 20 seconds. Thus, in this implementation, the time server ensures that, as the fastest time server in the distributed network increases speed (due to technological advancement or participation of more computationally powerful time servers), the rate at which blocks are added to the network remains unchanged.

9.4 New Block Reception

Generally, after broadcasting a proof-of-time over the distributed network, the time server can continue executing a current VDF thread or set of VDF threads until accessing a new and valid block based on the proof-of-time, at which time the time server can initiate a new thread (or modify the existing thread) based on the new block. More specifically, the time server can: access a new block including a proof-of-space and the proof-of-time in Step S250; and initiate a second thread of the VDF based on the new block in Step S260. Thus, the time server, upon receiving a valid new block for inclusion in the blockchain, can modify the VDF thread that the time server is executing to reflect the updated blockchain, thereby enabling the time server to generate proofs of time for successive blocks of the blockchain.

In one implementation, the time server can initiate an entirely new thread based on a cryptographic hash of the new canonical block received over the distributed network. In this implementation, the time server can convert the cryptographic hash of the new block into an input to the VDF (e.g., a quadratic form in a class group of unknown order) and can begin to execute VDF iterations based on this input. Alternatively, the time server can "infuse" the cryptographic hash of the new block into the current thread by concatenating and/or collating the cryptographic hash of the new block with the current VDF output most recently generated by the time server. In either case, the time server can then continue to iterate a VDF thread that incorporates the information within the new block, thereby cryptographically linking the new block with successive blocks of the blockchain.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for extending a blockchain, the method comprising:
   generating a plot file based on a plot seed, the plot file comprising a set of tables representing proofs-of-space;
   accessing a challenge based on a prior block of the blockchain;
   generating a proof-of-space based on the challenge and the plot file by identifying the proof-of-space responsive to the challenge in the set of tables;
   generating a new block comprising the proof-of-space; and
   broadcasting the new block over a distributed network.

2. The method of claim 1:
   further comprising accessing a proof-of-time; and
   wherein generating the new block comprises generating the new block comprising:
      the proof-of-space; and
      the proof-of-time.

3. The method of claim 2, wherein:
   generating the new block comprises:
      generating a new canonical block comprising:
         the proof-of-space; and
         the proof-of-time; and
      generating a new data block associated with the new canonical block, the new data block comprising a data payload; and
   broadcasting the new block over the distributed network comprises:
      broadcasting the new canonical block over the distributed network; and
      broadcasting the new data block over the distributed network.

4. The method of claim 3, wherein generating the new data block comprises generating the new data block comprising the data payload comprising:
   transaction data; and
   reward data.

5. The method of claim 2, wherein:
   accessing the proof-of-time comprises accessing a verifiable delay function output characterized by a number of verifiable delay function iterations corresponding to a time delay; and
   generating the new block further comprises generating the new block in response to accessing the verifiable delay function output.

6. The method of claim 2, wherein accessing the proof-of-time comprises generating the proof-of-time based on a verifiable delay function.

7. The method of claim 2:
   further comprising calculating a quality corresponding to the proof-of-space;
   further comprising calculating a time delay based on the quality; and
   wherein accessing the proof-of-time comprises accessing the proof-of-time based on the time delay.

8. The method of claim 1:
   wherein generating the plot file comprises generating the plot file characterized by an amount of drive storage allocated for generating proofs-of-space.

9. The method of claim 1, further comprising generating the plot seed based on a cryptographic hash of a combination of values, the combination of values comprising a private key of a space server and a pseudorandom value.

10. The method of claim 1, wherein accessing the challenge comprises calculating the challenge based on a cryptographic hash of the prior block.

11. A method for extending a blockchain, the method comprising:
    accessing a challenge based on a prior block of the blockchain;
    generating a proof-of-space based on the challenge, the proof-of-space indicating allocation of an amount of drive storage at a space server;
    initiating a first thread of a verifiable delay function based on the prior block;
    in response to executing a first number of iterations of the first thread, generating a verifiable delay function output;
    generating a new block comprising:
       the proof-of-space; and
       a proof-of-time based on the verifiable delay function output; and
    broadcasting the new block over a distributed network.

12. The method of claim 11:
    wherein initiating the first thread comprises initiating, at a time server, the first thread of the verifiable delay function based on the prior block;
    wherein generating the verifiable delay function output comprises generating, at the time server, the verifiable delay function output in response to executing the first number of iterations of the first thread;
    further comprising broadcasting, at the time server, the proof-of-time over the distributed network;
    further comprising receiving, at the space server, the proof-of-time;
    wherein generating the new block comprises generating, at the space server, the new block; and
    wherein broadcasting the new block comprises broadcasting, at the space server, the new block over the distributed network.

* * * * *